United States Patent

Grammatica et al.

Patent Number: 5,529,870
Date of Patent: Jun. 25, 1996

[54] HALOGENINDIUM PHTHALOCYANINE CRYSTALS

[75] Inventors: Steven J. Grammatica, Penfield, N.Y.; Ah-Mee Hor, Mississauga; Roger E. Gaynor, Oakville, both of Canada; Alan B. Mistrater, Rochester, N.Y.; Peter J. Valianatos, Rochester, N.Y.; John S. Chambers, Rochester, N.Y.; Rachael A. Forgit, Rochester, N.Y.; Jacques Poitras, L'Assomption, Canada

[73] Assignee: Xerox Corporation, Stamford, Conn.

[21] Appl. No.: 439,395

[22] Filed: May 11, 1995

[51] Int. Cl.$^6$ .......................................... G03G 5/06
[52] U.S. Cl. ................................... 430/78; 540/141
[58] Field of Search ................... 430/58, 59, 76; 540/141, 143

[56] References Cited

U.S. PATENT DOCUMENTS

| | | | |
|---|---|---|---|
| 4,286,033 | 8/1981 | Neyhart et al. | 430/58 |
| 4,291,110 | 9/1981 | Lee | 430/59 |
| 4,338,387 | 7/1982 | Hewitt | 430/58 |
| 4,471,039 | 9/1984 | Borsenberger et al. | 430/58 |
| 4,555,463 | 11/1985 | Hor et al. | 430/59 |
| 4,587,188 | 5/1986 | Kato et al. | 430/58 |
| 4,664,995 | 5/1987 | Horgan et al. | 430/59 |
| 4,731,312 | 3/1988 | Kato et al. | 430/31 |
| 5,091,278 | 2/1992 | Teuscher et al. | 430/60 |
| 5,213,929 | 5/1993 | Takano et al. | 430/78 |
| 5,302,710 | 4/1994 | Nukada et al. | 540/140 |
| 5,405,954 | 4/1995 | Liebermann et al. | 540/143 |

OTHER PUBLICATIONS

R. O. Loutfy et al., "Near-Infrared Photoreceptor Devices Incorporating Chloroindium Phthalocyanine," *Journal of Imaging Science*, vol. 29, No. 4, Jul./Aug. 1985, pp. 148–153.

*Primary Examiner*—John Goodrow
*Attorney, Agent, or Firm*—Oliff & Berridge

[57] ABSTRACT

An electrophotographic imaging member is characterized by a halogenindium phthalocyanine produced by dry milling and treating with an organic amine solvent.

13 Claims, 1 Drawing Sheet

HALOGENINDIUM PHTHALOCYANINE CRYSTALS

FIELD OF THE INVENTION

This invention relates to halogenindium phthalocyanine crystals having improved photosensitivity as charge generating pigments and to an electrophotographic photoreceptor containing the halogenindium phthalocyanine as a charge generating material.

BACKGROUND OF THE INVENTION

Chloroindium phthalocyanine is useful as a charge carrier generating pigment in electrophotographic photoreceptors. Chloroindium phthalocyanine is characterized by long wavelength infrared absorption at about 780 nm. Hence, chloroindium phthalocyanine crystals and halogenindium phthalocyanine crystals in general are candidates for use as charge generating pigments in photoreceptors that are used in printers having 780 nm laser diode exposure systems. However, photoreceptors that contain generating layers with chloroindium phthalocyanine are characterized by low sensitivity.

U.S. Pat. No. 4,471,039 to Borsenberger et al., teaches photoconductive elements containing the β-phase form of an indium phthalocyanine. U.S. Pat. No. 4,555,463 to Hor et al. teaches a photoresponsive imaging member comprised of a chloroindium phthalocyanine photogenerating composition. U.S. Pat. No. 4,587,188 to Kato et al. and U.S. Pat. No. 4,731,312 to Karo et al. teach a photoconductor with a chloroindium phthalocyanine and a method for electrophotography with a light source having a wavelength of about 650 nm or greater.

U.S. Pat. No. 5,302,710 to Nukada et al. teaches a phthalocyanine mixed crystal comprising a halogenated indium phthalocyanine and a halogenated gallium phthalocyanine. Nukada et al. discloses an electrophotographic photoreceptor containing the phthalocyanine mixed crystal. The mixed crystal is prepared by dry milling and treatment with an organic solvent. Electrophotographic photoreceptors containing the mixed crystal are characterized by improved stability upon repeated use.

Loutfy et al., "Near-Infrared Photoreceptor Devices Incorporating Chloroindium Phthalocyanine," *Journal of Imaging Science,* Volume 29, No. 4, July/August 1985, pp. 148–153 teaches the synthesis and purification of organic photoconductor chloroindium phthalocyanine. Loutfy et al. teaches the determination of X-ray diffraction characteristics of crystals of the choloroindium phthalocyanine and xerographic measurements of photoreceptor compositions containing chloroindium phthalocyanine. The disclosure of this reference is incorporated herein by reference.

The present invention relates to halogenindium phthalocyanines that are characterized by improved sensitivity. The improved sensitivity enables the halogenindium phthalocyanine to be used in high speed printers.

SUMMARY OF THE INVENTION

The present invention provides a chloroindium phthalocyanine crystal that has substantially improved sensitivity in an electrophotographic imaging member. The improved chloroindium phthalocyanine is prepared by a process of dry milling a chloroindium phthalocyanine and treating the chloroindium phthalocyanine with an amine solvent. The present invention provides an electrophotographic imaging member comprising the improved chloroindium phthalocyanine with increased sensitivity.

BRIEF DESCRIPTION OF THE DRAWING

The accompanying

DESCRIPTION OF PREFERRED EMBODIMENTS

Figure 1:
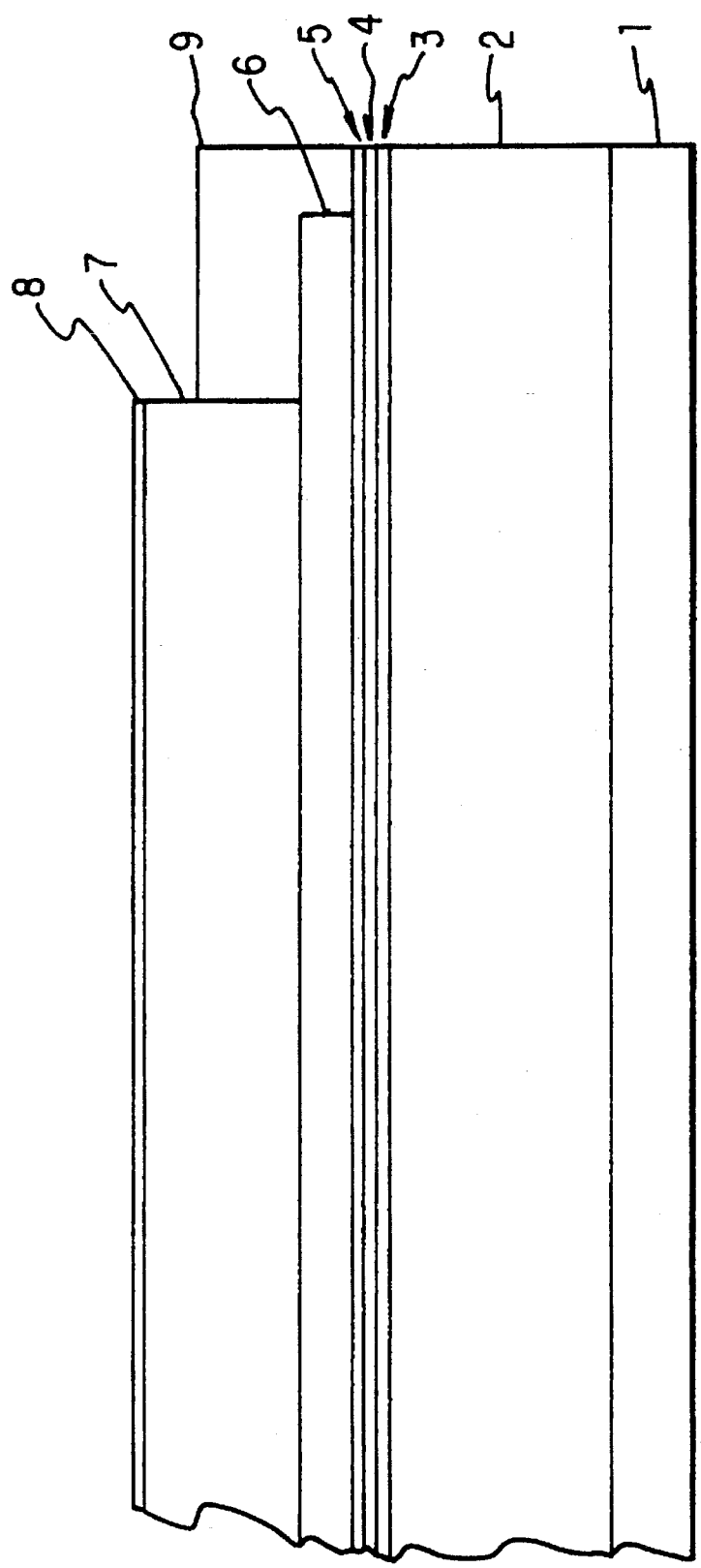
FIG. 1 is a cross-sectional view of a multilayer photoreceptor of the invention.

A representative structure of an electrophotographic imaging member of the present invention is shown in FIG. 1. This imaging member is provided with an anti-curl layer 1, a supporting substrate 2, an electrically conductive ground plane 3, a charge blocking layer 4, an adhesive layer 5, a charge generating layer 6, a charge transport layer 7 and an overcoating layer 8.

The Supporting Substrate

The supporting substrate 2 may be opaque or substantially transparent and may comprise numerous suitable materials having the required mechanical properties. An aluminum drum is the preferred substrate.

The substrate may further be provided with an electrically conductive surface (ground plane 3). Accordingly, the substrate may comprise a layer of an electrically non-conductive or conductive material such as an inorganic or an organic composition. As electrically non-conducting material, there may be employed various resins known for this purpose including polyesters, polycarbonates, polyamides, polyurethanes, and the like. For a belt-type imaging member, the electrically insulating or conductive substrate should be flexible and may have any number of different configurations such as, for example, a sheet, a scroll, an endless flexible belt, and the like. Preferably, the substrate is in the form of an endless flexible belt and comprises a commercially available biaxially oriented polyester known as Mylar, available from E.I. du Pont de Nemours & Co., or Melinex available from ICI Americas Inc.

The preferred thickness of the substrate layer depends on numerous factors, including economic considerations. The thickness of this layer may range from about 65 micrometers to about 150 micrometers, and preferably from about 75 micrometers to about 125 micrometers for optimum flexibility and minimum induced surface bending stress when cycled around small diameter rollers, e.g., 19 millimeter diameter rollers. The substrate for a flexible belt may be of substantial thickness, for example, 200 micrometers, or of minimum thickness, for example, 200 micrometers, or of minimum thickness, for example 50 micrometers, provided there are no adverse effects on the final photoconductive device. The surface of the substrate layer is preferably cleaned prior to coating to promote greater adhesion of adjacent layer. Cleaning may be effected by exposing the surface of the substrate layer to plasma discharge, ion bombardment and the like.

The Electrically Conductive Ground Plane

The electrically conductive ground plane 3 (if needed) may be an electrically conductive layer such as a metal layer which may be formed, for example, on the substrate 2 by any suitable coating technique, such as a vacuum depositing technique. Typical metals include aluminum, zirconium, niobium, tantalum, vanadium, hafnium, titanium, nickel, stainless steel, chromium, tungsten, molybdenum, and the like, and mixtures and alloys thereof. The conductive layer may vary in thickness over substantially wide ranges depending on the optical transparency and flexibility desired for the electrophotoconductive member. Accordingly for a flexible photoresponsive imaging device, the thickness of the conductive layer is preferably between about 20 Å to about 750 Å, and more preferably from about 50 Å to about 200 Å for an optimum combination of electrical conductivity, flexibility and light transmission.

Regardless of the technique employed to form a metal layer, a thin layer of metal oxide generally forms on the outer surface of most metals upon exposure to air. Thus, when other layers overlying the metal layer are characterized as "continuous" layers, it is intended that these overlying contiguous layers may, in fact, contact a thin metal oxide layer that has formed on the outer surface of the oxidizable metal layer. Generally for rear erase exposure, a conductive layer light transparency of at lest about 15 percent is desirable. The conductive layer need not be limited to metals. Other examples of conductive layers may be combinations of materials such as conductive indium tin oxide as a transparent layer for light having a wavelength between about 4000 Å and about 9000 Å or a conductive carbon black dispersed in a plastic binder as an opaque conductive layer. The conductive ground plane 3 may be omitted if a conductive substrate is used.

The Charge Blocking Layer

After deposition of any electrically conductive ground plane layer, the charge blocking layer 4 may be applied thereto. Electron blocking layers for positively charged photoreceptors allow holes from the imaging surface of the photoreceptor to migrate toward the conductive layer. For negatively charged photoreceptors, any suitable hole blocking layer capable of forming a barrier to prevent hole injection from the conductive layer to the opposite photoconductive layer may be utilized.

The blocking layer 4 may include polymers such as polyvinylbutyral, epoxy resins, polyesters, polysiloxanes, polyamides, polyurethanes and the like; nitrogen-containing siloxanes or nitrogen-containing titanium compounds such as trimethoxysilyl propyl ethylene diamine, N-beta-(aminoethyl) gamma-amino-propyl trimethoxy silane, isopropyl 4-aminobenzene sulfonyl titanate, di(dodecylbenzene sulfonyl) titanate, isopropyl di(4-aminobenzoyl)isostearoyl titanate, isopropyl tri(N-ethylamino) titanate, isopropyl trianthranil titanate, isopropyl tri(N,N-dimethyl-ethylamino) titanate, titanium-4-amino benzene sulfonate oxyacetate, titanium 4-aminobenzoate isostearate oxyacetate, $[H_2N(CH_2)_4]CH_3Si(OCH_3)_2$ (gamma-aminobutyl methyl dimethoxy silane), $[H_2N(CH_2)_3]CH_3Si(OCH_3)_2$ (gamma-aminopropyl methyl dimethoxy silane), and $[H_2N(CH_2)_3]Si(OCH_3)_3$ (gamma-aminopropyl trimethoxy silane) as disclosed in U.S. Pat. Nos. 4,338,387, 4,286,033 and 4,291,110.

A preferred hole blocking layer comprises a reaction product of a hydrolyzed silane or mixture of hydrolyzed silanes and the oxidized surface of a metal ground plane layer. The oxidized surface inherently forms on the outer surface of most metal ground plane layers when exposed to air after deposition. This combination enhances electrical stability at low relative humidity. The hydrolyzed silanes that can be used are hydrolyzed silanes that are well known in the art. For example, see U.S. Pat. No. 5,091,278 to Teuscher et al.

The blocking layer 4 should be continuous and may have a thickness of up to 2 micrometers depending on the type of material used. A blocking layer of between about 0.005 micrometer and about 0.3 micrometer is satisfactory because charge neutralization after the exposure step is facilitated and good electrical performance is achieved. A thickness between about 0.03 micrometer and about 0.06 micrometer is preferred for blocking layers for optimum electrical behavior.

The blocking layer 4 may be applied by any suitable technique such as spraying, dip coating, draw bar coating, gravure coating, silk screening, air knife coating, reverse roll coating, vacuum deposition, chemical treatment and the like. For convenience in obtaining thin layers, the blocking layer is preferably applied in the form of a dilute solution, with the solvent being removed after deposition of the coating by conventional techniques such as by vacuum, heating and the like. Generally, a weight ratio of blocking layer material and solvent of between about 0.5:100 to about 5.0:100 is satisfactory for spray coating.

The Adhesive Layer

An intermediate layer 5 between the blocking layer and the charge generating or photogenerating layer may be provided to promote adhesion. However in the present invention, a dip coated aluminum drum is the preferred substrate and is utilized without an adhesive layer. When an adhesive layer is utilized, it can be characterized by a dry thickness between about 0.01 micrometer to about 0.3 micrometer, more preferably about 0.05 to about 0.2 micrometer.

An adhesive layer, if utilized, may comprise any known adhesive for layers of an electrophotographic imaging member. The adhesive layer may comprise a film-forming polyester resin adhesive such as du Pont 49,000 resin (available from E.I. du Pont de Nemours & Co.), Vitel 1200 (available from Goodyear Rubber & Tire Co.), or the like. Both the du Pont 49,000 and Vitel 1200 adhesive layers provide reasonable adhesion strength and produce no deleterious electrophotographic impact on the resulting imaging member.

Another copolyester resin adhesive is available from Goodyear Tire & Rubber Co. as Vitel 2200. This polyester resin is a linear saturated copolyester of two diacids and two diols. The molecular structure of this linear saturated copolyester is represented by the following:

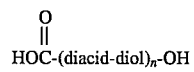

$$\text{HOC-(diacid-diol)}_n\text{-OH}$$

with a C=O above the first carbon.

where the ratio of diacid to ethylene glycol in the copolyester is 1:1. The diacids are terephthalic acid and isophthalic acid in a ratio of 1.2:1. The two diols are ethylene glycol and 2,2-dimethyl propane diol in a ratio of 1.33:1. The Goodyear Vitel 2200 linear saturated copolyester consists of randomly alternating monomer units of the two diacids and the two diols and has a weight average molecular weight of about 58,000 and a Tg of about 67° C.

Other suitable copolyesters include Goodyear Vitel 1710, Vitel 1870, Vitel 3300, Vitel 3550 and Vitel 5833. Vitel 5833 is a short chained branched polymer having cross-linkable hydroxyl and carboxylic acid functional groups. Vitel 5833 is particularly useful by itself or blended with other polyesters in applications requiring an increase of adhesive layer cross-linking density.

The Charge Generating Layer

The charge generating layer 6 comprises a polymer binder and a photoconductive pigment. The photoconductive pigment is a halogenindium phthalocyanine or mixtures of halogenindium phthalocyanine with at least one other metal-containing phthalocyanine pigment. The halogenindium phthalocyanine can be halogenated with chlorine, bromine or iodine. Chloroindium phthalocyanine is the preferred pigment. In another preferred embodiment, the pigment includes a mixture of chloroindium phthalocyanine and a second metal-containing phthalocyanine. The second metal-containing phthalocyanine is preferably a TiO phthalocyanine (IV) or an hydroxygallium phthalocyanine (V) pigment.

The halogenindium phthalocyanine according to the present invention is in the form of small particles that characteristically scatter light differently from larger particles. The particles of the present invention exhibit characteristic light scattering indices.

The ratio of the halogenindium phthalocyanine crystal (I)/second metal-containing phthalocyanine pigment component (II) in the preferred mixed pigment of the present invention is a ratio of from about 5/95 to 95/5 by weight and preferably from 10/90 to 90/10 by weight.

A halogenindium phthalocyanine crystal can be synthesized by known processes, such as a process comprising reacting a trihalogenated indium with phthalocyanine or diiminoisoindoline in an appropriate organic solvent. See Loutfy et al., supra. In the preparation of the halogenindium phthalocyanine crystal (I) of the present invention, a halogenindium phthalocyanine is ground by dry grinding or milling (e.g., salt milling) in a ball mill, a sand mill, a kneader, a mortar, attritor, etc. followed by treatment with an organic amine solvent. Examples of useful organic solvents include triethanol amine, N,N-dimethylacetamide, dimethylformamide and diethylformamide. A particular preferred solvent is N,N-dimethylformamide (DMF). The phthalocyanine crystal (I) of the present invention is useful as a charge generating material for electrophotography and provides an electrophotographic photoreceptor that exhibits excellent sensitivity. The dry grinding or milling step (A) can be carried out for a period of 24 to 100 hours preferably 72 to 96 hours. In solvent treating step (B), proportion of the solvent to phthalocyanine is generally from 1/1 to 200/1, preferably from 10/1 to 100/1.

The halogenindium phthalocyanine crystal (I) is characterized by improved purity. The grinding step may produce an extremely small particle having high surface area. Smaller, high surface area particles may permit substantially improved efficiency in the solvent treatment steps. Prior to the treatment process of the invention, the halogenindium phthalocyanine has a particle size in the range of 50 to 1000 nm. After grinding or milling, the particle size is significantly reduced to the range of 50 to 250 nm.

The photoreceptor of the present invention preferably uses a blend of TiO phthalocyanine (IV) and chloroindium phthalocyanine to achieve a balanced sensitivity. Surprisingly, the pretreated chloroindium phthalocyanine contributes a sensitivity to the mixture so that less TiO phthalocyanine (IV) pigment is required to provide a resulting photoreceptor having satisfactory sensitivity. For example, a mixture of pretreated chloroindium phthalocyanine with about 15–20% TiO phthalocyanine (IV) has about the same sensitivity as a mixture of untreated chloroindium phthalocyanine with about 20–25% TiO phthalocyanine (IV). Additionally, pretreated chloroindium phthalocyanine can be used as a low sensitivity component in other photoreceptor designs. A pretreated chloroindium phthalocyanine can be mixed with a higher sensitivity pigment such as hydroxygallium phthalocyanine.

The charge generating layer is formed by coating on a conductive substrate, a coating composition prepared by dispersing the phthalocyanine crystal (I) of the present invention in a solution of the binder resin in an organic solvent. A compounding ratio of the phthalocyanine crystal to the binder resin generally ranges from 40/1 to 1/10, and preferably from 10/1 to /1:4, by weight. If the ratio of the phthalocyanine mixed crystal is too high, the stability of the coating composition tends to be reduced. If it is too low, the sensitivity of the charge generating layer tends to be reduced.

The solvents to be used in the coating compositions are preferably selected from those incapable of dissolving the lower layer, i.e., the layer on which the charge generating layer is applied. Examples of the organic solvents include alcohols, e.g., methanol, ethanol, and isopropanol; ketones, e.g., acetone, methyl ethyl ketone, and cyclohexanone; amides, e.g., N,N-dimethylformamide and N,N-dimethylacetamide; dimethyl sulfoxides; ethers, e.g., tetrahydrofuran, dioxane, and ethylene glycol monomethyl ether; esters, e.g., methyl acetate and ethyl acetate; halogenated aliphatic hydrocarbons, e.g., chloroform, methylene chloride, dichloroethylene, carbon tetrachloride, and trichloroethylene; and aromatic hydrocarbons, e.g., benzene, toluene, xylene, ligroin, monochlorobenzene, and dichlorobenzene.

The coating composition for a charge generating layer can be coated by any known coating technique, such as dip coating, spray coating, spin coating, bead coating, wire bar coating, blade coating, roller coating, and curtain coating. Drying after coating is preferably carried out first by drying at room temperatures to the touch and then heat-drying. Heat-drying may be performed at a temperature of from 50° to 200° C. for a period of from 5 minutes to 2 hours in still air or in an air flow. The charge generating layer usually has a thickness of from about 0.05 to 5 μm.

The Charge Transport Layer

The charge transport layer 7 may comprise any suitable transparent organic polymer or non-polymeric material capable of supporting the injection of photogenerated holes or electrons from the charge generating layer 6 and allowing the transport of these holes or electrons to selectively discharge the surface charge. The charge transport layer not only serves to transport holes or electrons, but also protects the charge generating layer from abrasion or chemical attack and therefore extends the operating life of the imaging member.

The charge transport layer is substantially transparent to radiation in a region in which the imaging member is to be used. The charge transport layer is normally transparent when exposure is effected therethrough to ensure that most of the incident radiation is utilized by the underlying charge generating layer. When used with a transparent substrate, imagewise exposure or erase may be accomplished through the substrate with all light passing through the substrate. In this case, the charge transport material need not transmit light in the wavelength region of use.

The charge transport layer may comprise activating compounds dispersed in normally electrically inactive polymeric materials for making these materials electrically active. These compounds may be added to polymeric materials that are incapable of supporting the injection of photogenerated charge and incapable of allowing the transport of this charge. An especially preferred transport layer employed in multi-layer photoconductors comprises from about 25 percent to about 75 percent by weight of at least one charge transporting aromatic amine compound, and about 75 percent to about 25 percent by weight of a polymeric film-forming resin in which the aromatic amine is soluble.

The charge transport layer is preferably formed from a mixture comprising one or more compounds having the general formula:

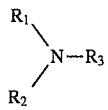

wherein $R_1$ and $R_2$ are selected from the group consisting of substituted or unsubstituted phenyl groups, naphthyl groups, and polyphenyl groups and $R_3$ is selected from the group consisting of substituted or unsubstituted aryl groups, alkyl groups having from 1 to 18 carbon atoms and cycloaliphatic groups having from 3 to 18 carbons atoms. The substituents should be free from electron-withdrawing groups such as $NO_2$ groups, Cn groups, and the like.

Examples of charge transporting aromatic amines represented by the structural formula above include triphenylmethane, bis(4-diethylamine- 2-methylphenyl)-phenylmethane; 4,4'-bis(diethylamino)- 2,2'-dimethyltriphenylmethane; N,N'-bis(alkyl-phenyl)-(1,1'-biphenyl)- 4,4'-diamine wherein the alkyl is, for example methyl, ethyl, propyl, n-butyl, etc., N,N'-diphenyl-N,N'-bis(3-methylphenyl)-(1,1'-biphenyl)-4,4'-diamine; and the like, dispersed in an inactive resin binder.

Any suitable inactive resin binder soluble in methylene chloride or other suitable solvent may be employed. Typical inactive resin binders soluble in methylene chloride include polycarbonate resin, polyvinylcarbazole, polyester, polyacrylate, polyether, polysulfone, and the like. Molecular weights can vary from about 20,000 to 1,500,000. Other solvents that may dissolve these binders include tetrahydrofuran, toluene, trichloroethylene, 1,1,2-trichloroethane, 1,1,1-trichloroethane, and the like.

The preferred electrically inactive resin materials are polycarbonate resins having a molecular weight from about 20,000 to about 120,000, more preferably from about 50,000 to about 100,000. The materials most preferred as the electrically inactive resin materials are poly(4,4'-dipropylidene-diphenylene carbonate) with a molecular weight of from about 35,000 to about 40,000, available as Lexan 145 from General Electric Company; poly(4,4'-isopropylidene-diphenylene carbonate) with a molecular weight of from about 40,000 to about 45,000, available as Lexan 141 from General Electric Company; a polycarbonate resin having a molecular weight of from about 50,000 to about 100,000, available as Makrolon from Farbenfabricken Bayer A.G.; a polycarbonate resin having a molecular weight of from about 20,000 to about 50,000, available as Merlon from Mobay Chemical Company; polyether carbonates; and 4,4'-cyclohexylidene diphenyl polycarbonate. Methylene chloride solvent is a desirable component of the charge transport layer coating mixture for adequate dissolving of all the components and for its low boiling point.

The thickness of the charge transport layer may range from about 10 micrometers to about 50 micrometers, and preferably from about 20 micrometers to about 35 micrometers. Optimum thicknesses may range from about 23 micrometers to about 31 micrometers.

The Ground Strip

Ground strip 9 may comprise a film-forming binder and electrically conductive particles. Cellulose may be used to disperse the conductive particles. Any suitable electrically conductive particles may be used in the electrically conductive ground strip layer 9. The ground strip 9 may comprise materials which include those enumerated in U.S. Pat. No. 4,664,995. Typical electrically conductive particles include carbon black, graphite, copper, silver, gold, nickel, tantalum, chromium, zirconium, vanadium, niobium, indium tin oxide and the like. The electrically conductive particles may have any suitable shape. Typical shapes include irregular, granular, spherical, elliptical, cubic, flake, filament, and the like. Preferably, the electrically conductive particles should have a particle size less than the thickness of the electrically conductive ground strip layer to avoid an electrically conductive ground strip layer having an excessively irregular outer surface. An average particle size of less than about 10 micrometers generally avoids excessive protrusion of the electrically conductive particles at the outer surface of the dried ground strip layer and ensures relatively uniform dispersion of the particles through the matrix of the dried ground strip layer. Concentration of the conductive particles to be used in the ground strip depends on factors such as the conductivity of the specific conductive particles utilized.

The ground strip layer may have a thickness from about 7 micrometers to about 42 micrometers, and preferably from about 14 micrometers to about 27 micrometers.

The Anti-Curl Layer

The anti-curl layer 1 is optional, and may comprise organic polymers or inorganic polymers that are electrically insulating or slightly semi-conductive. The anti-curl layer provides flatness and/or abrasion resistance.

Anti-curl layer 1 may be formed at the back side of the substrate 2, opposite to the imaging layers. The anti-curl layer may comprise a film-forming resin and an adhesion promoter polyester additive. Examples of film-forming resins include polyacrylate, polystyrene, poly(4,4'-isopropylidene diphenyl carbonate), 4,4'-cyclohexylidene diphenyl polycarbonate, and the like. Typical adhesion promoters used as additives include 49,000 (du Pont), Vitel PE-100, Vitel PE-200, Vitel PE-307 (Goodyear), and the like. Usually from about 1 to about 15 weight percent adhesion promoter is selected for film-forming resin addition. The thickness of the anti-curl layer is about 3 micrometers to about 35 micrometers, and preferably about 14 micrometers.

The anti-curl coating may be applied as a solution prepared by dissolving the film forming resin and the adhesion promoter in a solvent such as methylene chloride. The solution is applied to the rear surface of the supporting substrate (the side opposite to the imaging layers) of the photoreceptor device by hand coating or by other methods known in the art. The coating wet film is then dried to produce the anti-curl layer 1.

The Overcoating Layer

The optional overcoating layer 8 may comprise organic polymers or inorganic polymers that are capable of transporting charge through the overcoat. The overcoating layer may range in thickness from about 2 micrometers to about 8 micrometers, and preferably from about 3 micrometers to about 6 micrometers. An optimum range of thickness is from about 3 micrometers to about 5 micrometers.

The invention will further be illustrated in the following, non-limiting examples, it being understood that these examples are intended to be illustrative only and that the invention is not intended to be limited to the materials, conditions, process parameters and the like recited therein.

Chloroindium phthalocyanine is useful as a xerographic charge generator pigment in applications requiring about 780 nm infrared sensitivity. However, low sensitivity to light at 780 nm wavelength has limited the use of chloroindium phthalocyanine pigment. For example, dispersions of chloroindium phthalocyanine usually has a sensitivity of only about 15–25 volts/erg/cm squared. The following example describes the preparation of a chloroindium phthalocyanine pigment according to the present invention that results in a pigment with a increased sensitivity to light at 780 nm wavelength of between 35–45 volts/erg $cm^2$.

EXAMPLE

Chloroindium phthalocyanine (ClInPc) crude pigment, 300 g, is placed in a 4L polypropylene jar containing 2.65 kg of glass beads of 6 mm diameter. The jar is closed and placed on a roll mill at 50–60 rpm (jar speed) for 96 hours. Dimethyl formamide (DMF), 1.5L, is added to the jar and milling is continued for an additional 48 hours. The pigment is separated from the glass beads by filtration using a Buchner funnel and rinsing with DMF. The pigment is removed from the Buchner funnel and a reslurry is washed in 3L of hot (75° C.) DMF for 1 hour in a 4L beaker and then filtered again in the Buchner funnel. The hot DMF slurry wash process is repeated three additional times. Finally, the pigment is slurried in 3L of methanol, followed by filtration four times to remove the DMF. The final filtered pigment is dried at 80°–85° under vacuum to remove residual methanol.

Particle size of ClInPc materials before and after treatment is examined using electron microscopy. Prior to treatment, particle size is from 50 to 1000 nm. After treatment, the particle size of the ClInPc materials are significantly reduced to vary from 50 to 250 nm. Larger particles are no longer present.

The pigment is dispersed as follows: A solution of n-butyl acetate, 900 g, and polyvinyl butyral, 32 g is prepared. The ClInPc pigment, 68 g, is added and the mixture stirred for 1 hour using a high shear Silverson mixer. The mixture is then circulated through a Dynomill dispersing apparatus containing 0.4 mm ZrO media to reduce particle size to about 0.1–0.2 μm. An additional 900 g of n-butyl acetate is added to the dispersion to prepare a coating composition.

The dispersion composition prepared above is added to a small dip tank. A drum that has have been precoated with a 1.5 μm Luckamide (polyamide) undercoat layer is dip coated to apply the charge generation layer (CGL). The drum is dried and overcoated with a charge transport layer (CTL) to a thickness between 15–20 μm.

Table 1 illustrates the beneficial effects of the pretreated ClInPc compared to the untreated ClInPc. Increased sensitivity is demonstrated by both the dV/dX number, which represents initial slope of the Photo Induced Discharge Curve (PIDC). PIDC is used to characterize photoresponse of a photoreceptor by plotting surface potential versus exposed energy. A steep initial dV/dX slope indicates high sensitivity. Sensitivity is further demonstrated by the 7 erg and 25 erg exposure voltages, which are significantly lower when using the treated pigment. Plotted dV/dX values indicate that sensitivity is increased by 53% by the treatment of the present invention.

TABLE 1

| Xerographic Characteristic | Untreated ClInPc | Treated ClInPc |
|---|---|---|
| Vddp | 350 | 350 |
| Sensitivity dV/dX | 26 | 40 |
| dark decay % | 4 | 6 |
| 7 erg exposure voltage | 259 | 210 |
| 25 erg exposure voltage | 131 | 90 |
| Residual voltage | 45 | 44 |

While the invention has been described with reference to a particular preferred embodiment, the invention is not limited to the specific Example given, and other embodiments and modifications can be made by those skilled in the art without departing from the spirit and scope of the invention and claims.

What is claimed is:

1. A method of preparing a halogenindium phthalocyanine, comprising (A) dry grinding or milling a halogenindium phthalocyanine and (B) treating said halogenindium phthalocyanine with an organic amine solvent to produce a halogenindium phthalocyanine having improved sensitivity at a wavelength of infrared absorption.

2. The method according to claim 1, wherein said dry grinding or milling is conducted in a ball mill, a sand mill, a kneader or an attritor.

3. The method of claim 1, wherein said organic amine solvent is selected from the group consisting of triethanol amine, N,N-dimethylacetamide, dimethylformamide and diethylformamide.

4. The method of claim 1, wherein said organic amine solvent is N,N-dimethylformamide.

5. The method of claim 1, wherein step (A) comprises kneading or milling for a period from 24 to 100 hours.

6. The method of claim 1, wherein step (B) comprises treating said halogenindium phthalocyanine with an organic amine solvent in a proportion of solvent to halogenindium phthalocyanine of from 1/1 to 200/1.

7. The method of claim 1, wherein step (B) comprises treating said halogenindium phthalocyanine with an organic amine solvent in a proportion of solvent to halogenindium phthalocyanine of from 10/1 to 100/1.

8. The method of claim 1, wherein said halogenindium phthalocyanine is chloroindium phthalocyanine.

9. The method of claim 1, wherein step (A) comprises kneading or milling for a period from 72 to 96 hours.

10. A halogenindium phthalocyanine, produced by a method comprising (A) dry grinding or milling a halogenindium phthalocyanine and (B) treating said halogenindium phthalocyanine with an organic amine solvent, said halogenindium phthalocyanine characterized by a particle size in the range of 50–250 nm.

11. An electrophotographic imaging member comprising the halogenindium phthalocyanine of claim 10.

12. An electrophotographic imaging member comprising the halogenindium phthalocyanine of claim 10 and a TiO phthalocyanine (IV) pigment.

13. An electrophotographic imaging member comprising the halogenindium phthalocyanine of claim 10 and an hydroxygallium phthalocyanine (V) pigment.

* * * * *